(12) United States Patent
Legeay

(10) Patent No.: US 7,438,511 B2
(45) Date of Patent: Oct. 21, 2008

(54) DEVICE FOR MOUNTING A SEAT ON A MOUNTING RAIL

(75) Inventor: Alexis Legeay, Les Bordes (FR)

(73) Assignee: Societe Industrielle et Commerciale de Materiel Aeronautique - Sicma Aero Seat, Issoudun (FR)

( * ) Notice: Subject to any disclaimer, the term of this patent is extended or adjusted under 35 U.S.C. 154(b) by 83 days.

(21) Appl. No.: 11/469,033

(22) Filed: Aug. 31, 2006

(65) Prior Publication Data

US 2007/0065248 A1    Mar. 22, 2007

(30) Foreign Application Priority Data

Sep. 7, 2005    (FR) .................................. 05 09118

(51) Int. Cl.
*B60P 7/08*    (2006.01)

(52) U.S. Cl. ........................... 410/105; 410/104; 410/77

(58) Field of Classification Search ................ 410/104, 410/105, 77, 80; 244/118.1, 118.6, 122 R; 248/503.1
See application file for complete search history.

(56) References Cited

U.S. PATENT DOCUMENTS

| 4,062,298 A | 12/1977 | Weik | 410/105 |
| 4,496,271 A | 1/1985 | Spinosa et al. | 410/105 |
| 4,708,549 A * | 11/1987 | Jensen | 410/105 |
| 6,902,365 B1 | 6/2005 | Dowty | 410/105 |

FOREIGN PATENT DOCUMENTS

| DE | 29825000 | 3/2004 |
| DE | 10337746 | 3/2005 |

OTHER PUBLICATIONS

Foreign Search Report.

* cited by examiner

*Primary Examiner*—Stephen Gordon
(74) *Attorney, Agent, or Firm*—Baker Botts L.L.P.

(57) ABSTRACT

The invention relates to a device for mounting a seat on a mounting rail. This device comprises a base that comprises a band operable for linking to a seat, a groove that can receive the sliding nut guide rail, and a longitudinal blocking piston insertable in a suitable section of the mounting rail such that the piston is restrained longitudinally, a sliding nut comprising protrusions that form lateral lips, and a guide rail insertable into the groove of the base, said sliding nut being arranged so as to slide in relation to said base when said base is releasably secured to said mounting rail with the protrusions in the rail, between an installation position and a blocked position, and a control lever hinged to the base and to the sliding nut, so as to cause said lever to move in between an open position in which the sliding nut is in its installation position and a closed position in which the sliding nut is in its blocked position.

8 Claims, 5 Drawing Sheets

DEVICE FOR MOUNTING A SEAT ON A MOUNTING RAIL

PRIORITY

This application claims priority to French Application No. 0509118 filed Sep. 7, 2005.

TECHNICAL FIELD OF THE INVENTION

The present invention concerns a device for mounting a seat on a mounting rail, said rail comprising a back wall, two lateral walls and two wings that delimit a groove in the shape of an inverted T, said wings forming notches at regular intervals that define widened and narrowed sections of the passage in between the edges of the wings. In particular, the invention concerns a device comprising: a base comprising a band operable for linking to a seat, a groove adapted to receive the sliding nut guide rail, and a longitudinal blocking piston operably insertable into one of said widened sections of the mounting rail such that the piston is restrained longitudinally from entering the narrowed section, said base being releasably secured to said mounting rail; and a sliding nut comprising protrusions that form lateral lips, and a guide rail insertable into said groove of the base, said sliding nut being arranged so as to slide in relation to said base when said base is releasably secured to said mounting rail with said protrusions placed in said rail, between an installation position and a blocked position, such that in an installation position, when the piston of the base is in a widened section, the lips of the sliding nut can be inserted in one of such widened sections, and in a blocked position, the lips of the sliding nut are held by said wings in said narrowed sections.

BACKGROUND OF THE INVENTION

Such rails and mounting devices are known in the prior art, in particular in the field of aircraft.

The same type of system is known, for example, from document U.S. Pat. No. 5,975,822. In this case, the system comprises a base and a stud with a pin link with an axis in line with the rail. The base comprises a pin mounting for the pin link with the leg of the seat and pistons to ensure the horizontal blocking. The stud comprises two lips for ensuring the vertical blocking, placed so that when the stud is turned one quarter of a turn, it cannot be removed from the rail. To lock the system, it is therefore enough to place the base in the rail and turn the stud one quarter of a turn.

A device such as described above is also known from document U.S. Pat. No. 4,496,271. This document describes a system for attaching a seat to the rail of an aircraft with no movement of the seat in the rail. The system comprises a base and a sliding nut which are slidingly connected to each other. The base comprises a pin mounting for the pivoting link with the leg of the seat and pistons to ensure the horizontal blocking. The sliding nut comprises lips for ensuring the vertical blocking. To lock the system, it is enough to simply place the base in the rail and slide the sliding nut half a step.

The latter devices, however, have the disadvantage that the devices for blocking the sliding nut are complex, not very reliable and difficult to implement.

The present invention has the aim of resolving these disadvantages.

More particularly, the invention has the aim of supplying a device for mounting a seat on a mounting rail that makes it possible quickly to mount, lock and dismount a seat on the rails of an aircraft:

without moving the seat,
with few handling actions,
without any specific tools for ensuring the blocking,
without adjustment,
with safety blocking,
with a system locking indicator.

SUMMARY OF THE INVENTION

For this purpose, the invention relates first of all to a device for mounting a seat on a mounting rail, said rail comprising a back wall, two lateral walls and two wings that delimit a groove in the shape of an inverted T, said wings forming notches at regular intervals that define widened and narrowed sections of the passage in between the edges of the wings, said device comprising: a base, a sliding nut, a control lever, and a locking means; wherein the base comprises a band operable for linking to a seat, a groove adapted to receive the sliding nut guide rail, and a longitudinal blocking piston operably insertable into one of said widened sections of the mounting rail such that the piston is restrained longitudinally from entering the narrowed section, said base being releasably secured to said mounting rail; the sliding nut comprises protrusions that form lateral lips, and a guide rail insertable into said groove of the base, said sliding nut being arranged so as to slide in relation to said base when said base is releasably secured to said mounting rail with said protrusions placed in said rail, between an installation position and a blocked position, such that in an installation position, when the piston of the base is in a widened section, the lips of the sliding nut can be inserted in one of such widened sections, and in a blocked position, the lips of the sliding nut are held by said wings in said narrowed sections; the control lever is hinged to said base and said sliding nut, so as to cause said lever to move in between an open position and a closed position in relation to said installation position and said blocked position of the sliding nut; and the locking means is operable to lock said lever in its closed position.

In a specific embodiment of the invention, the device further comprises a compressable support for compensating the play means that exists between the rail and the device when the sliding nut passes from its installation position to its blocked position.

More particularly, said compressable support comprises a flexible stop for said sliding pin.

Even more particularly, said flexible stop can be arranged in a widened section at the end of said elongated slot in which said sliding pin slides when said sliding nut reaches its blocked position.

Also in a specific embodiment of the invention, said locking means comprise a spring plate operably connected on the base and capable of cooperating with a hook solidly attached to the control lever.

Also in a specific embodiment of the invention, unlocking means are provided for unlocking said lever from its closed position.

More particularly, said unlocking means can comprise a cam which, in one of its positions, allows the spring plate to rest against the bottom of said hook, and in another position, pushes the spring plate back outside the hook.

Even more particularly, said cam can be eccentric and capable of being driven in rotation between said positions by a spanner.

The present invention also relates to an aircraft comprising a device such as described above for the installation of its seats.

BRIEF DESCRIPTION OF THE DRAWING

The following is a description, by way of non-limiting example, of particular embodiments of the invention, made in reference to the appended diagrammatic drawings, in which.

DESCRIPTION OF THE INVENTION

Figure 1:
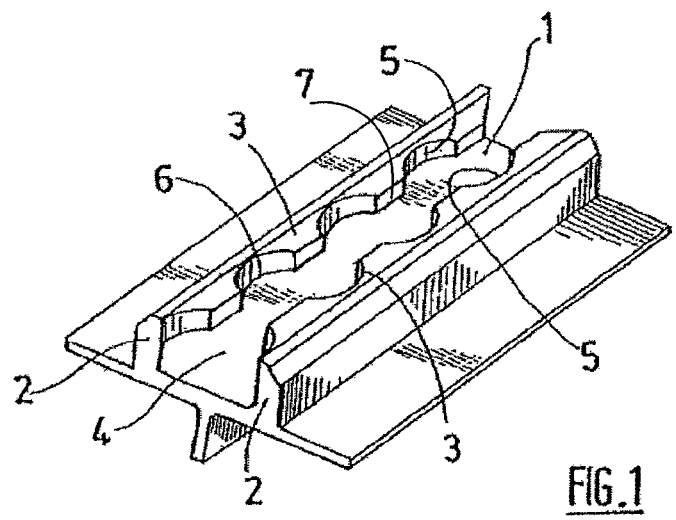
FIG. 1 is a perspective view of a section of rail for mounting an aircraft seat with the help of a device according to the invention.

Referring now to FIG. 1, there is shown a typical rail for the installation of passenger seats in the cabin of an aircraft. This rail consists of a metal section in which a back wall 1, two lateral walls 2 and two wings 3 generally parallel to the back wall 1 delimit a groove 4 in the shape of an inverted T. Notches 5 are formed at regular intervals in the wings 3 so that the passage delimited between the edges of the wings has an alternation of widened sections 6 and narrowed sections 7.

The following refers to FIGS. 2 through 5.

A device according to the invention comprises, essentially, a base 10, a sliding nut 11 and a control lever 12.

The base 10 includes a base plate 15 which first of all, on its side opposite the rail, comprises a metal band 16 pierced with a hole 17 that makes it possible to hinge the base to a yoke joint (not shown) solidly attached to a seat. The base plate 15 also comprises, on the same side as the metal band 16, two flanges 18 forming stops for the lever 12 as will be seen below, and a hinging yoke joint 19 for the lever. Finally, the base plate comprises, on its other face, two pistons 20a and 20b, the piston 20b being located substantially opposite the yoke joint 19 on the other side of the base plate, having a smaller extension in the direction that is perpendicular to the plane of the base plate 15.

The flanges 18 comprise holes 21 that can accommodate an unlocking member 22, which is described below. The yoke joint 19 comprises holes 23 that allow the passage of a joint pin 24 for the control lever 12.

Finally, the base forms a T-shaped groove 25 open on the side of the rail, with the function as described below.

The sliding nut 11 comprises a body 30 including, on the side opposite the rail, a metal band 31 equipped with an elongated slot 32 generally in the direction that is perpendicular to the rail. The slot 32 ends, at its distal end from the rail, in a cylindrical orifice 33 with a diameter that is larger than the width of the slot, that accommodates a cylinder 34 made from an elastic material, with the function as described below.

On the same side as the metal band 31, the body 30 of the sliding nut 11 comprises a T-shaped guide rail 35 that complements the groove 25, enabling the sliding nut 11 to slide in relation to the base 10.

On the side of the rail, the body 30 of the sliding nut 11 comprises a plurality of protrusions 36, in this case three, in the shape of an inverted T, substantially complementary to the shape of the groove 4 of the rail. The protrusions comprise lateral lips 37 that can be inserted between the back wall 1 of the rail and its wings 3.

The control lever 12 comprises two flanges 40. Each flange 40 has a hole 41 for the passage of the pin 24 so as to hinge the lever 12 to the base 10. Each flange 40 also has a hole 42 for the passage of a pin 43 arranged such as to move in the elongated slot 32.

The lever 12 also comprises two hooks 44, with their points facing the front according to the direction of rotation for closing the lever, and on the side opposite the rail. Each flange 40 also has a stop 45 placed in the same direction as the points of the hooks so as to cooperate with the flanges 18 of the base 10 at the end of the rotation travel of the lever.

A T-shaped plate spring 50 has the end of its rod 51 fixed by means of a screw 52 to the base 10. Each side 53 of the cross of the T is arranged such as to cooperate with a hook 44.

The unlocking element 22 consists of a cylinder equipped with a central flat section 60 arranged such as to cooperate with the rod 51 of the plate spring 50, thus forming an eccentric cam. An end orifice 61 with a hexagonal cross-section makes it possible to drive the rotation of the element 22 with the help of a spanner.

The device described in the preceding paragraphs works as follows.

Both of the two pistons 20a and 20b have a flat shape that allows them to be individually inserted in a widened section 6 between two notches 5 placed opposite each other. The distance between them also allows them to be inserted simultaneously: in this case it is equal to two steps of the notches 5 so that the two pistons 20 leave an empty widened section 5 between them. Finally, the transversal shape of the pistons 20 prevents any longitudinal translation movement when they are inserted and blocked in this direction by the integral protrusions of the wings 3 between two notches 5.

Likewise, the flat shape of each protrusion 36 allows it to be inserted individually in a widened section 6 between two notches 5 located opposite each other. The distance between them also allows them to be inserted simultaneously; in this case it is equal to one step of the notches 5 so that the three protrusions 36 can be inserted in three successive widened sections 5. Finally, due to the inverted T-shaped cross-section of the protrusions 36, they can slide along the rail when they are inserted in the groove 4 of the latter.

Figure 3A:
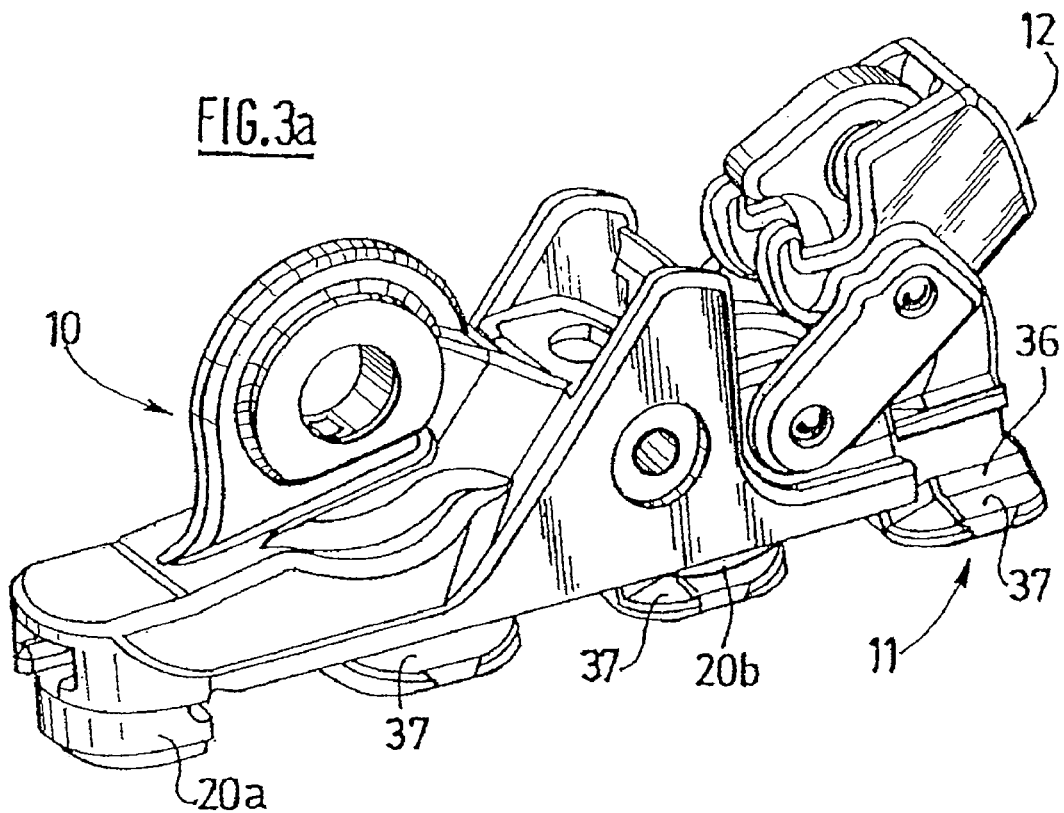
FIG. 3a is perspective view of this device according to the invention in the open position.
Figure 3B:
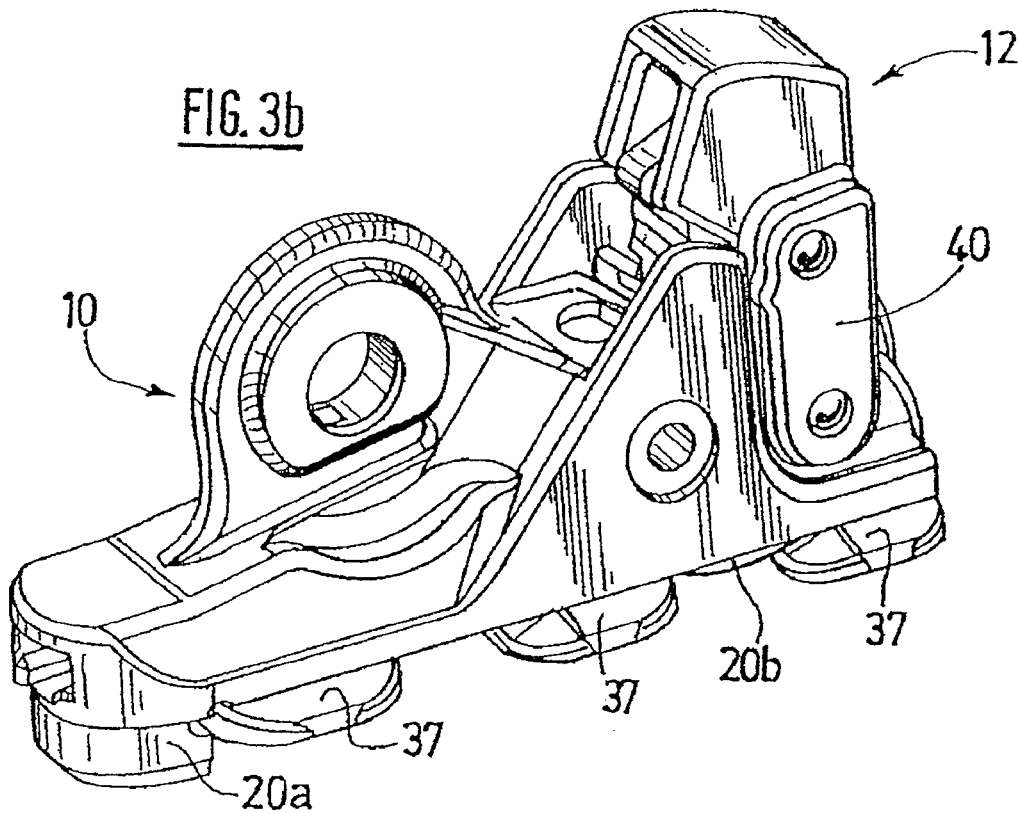
FIG. 3b is a perspective view of this device according to the invention in the closed position.
Figure 5:
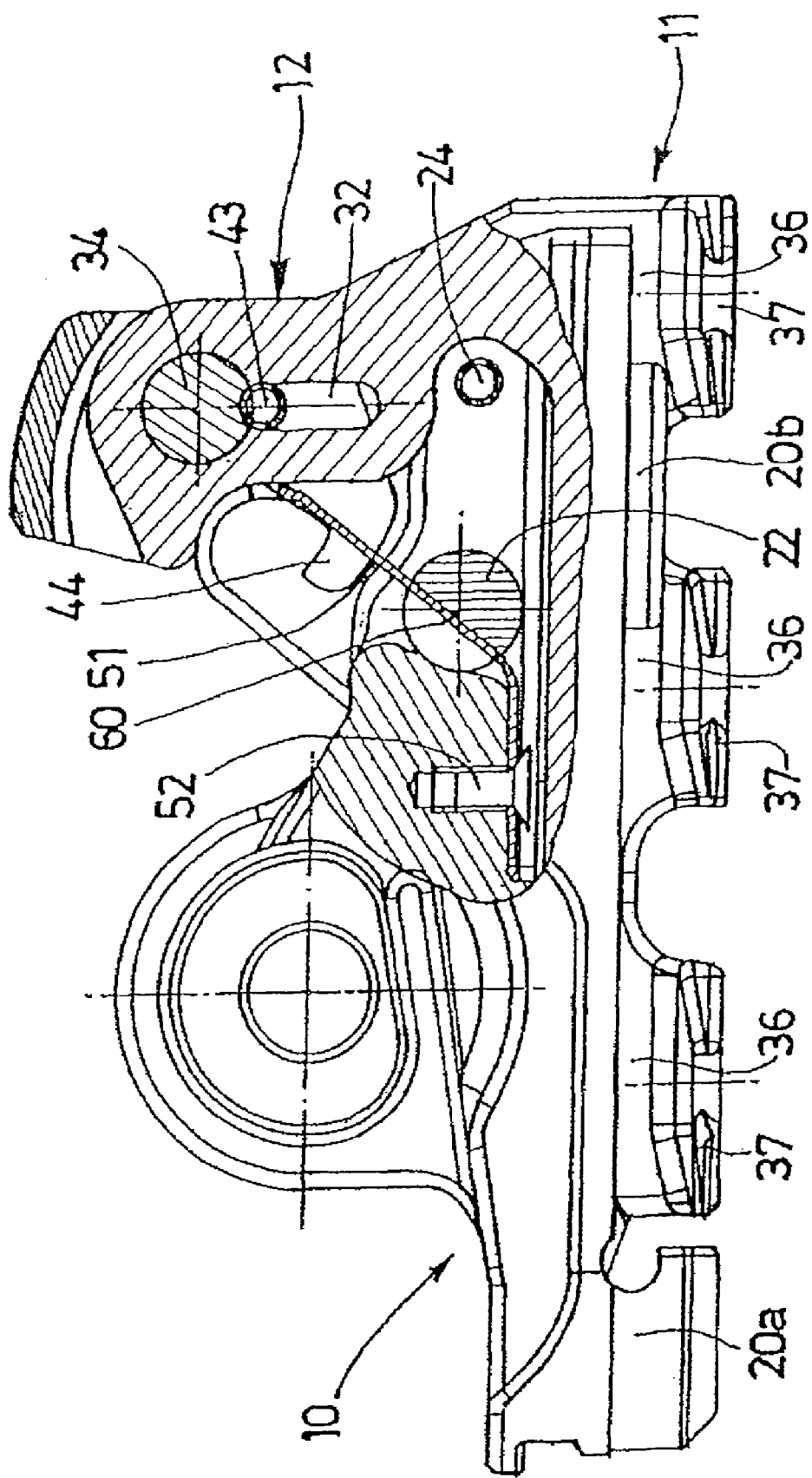
FIG. 5 is a longitudinal section view of this device.

When the device is in the open position shown in FIG. 3a, with the guide rail 35 inserted in the groove 25, the central protrusion 36 is accommodated under the piston 20b, due to the smaller extension of the latter. In this position, the device can therefore be inserted in four successive widened sections 6 of the rail, a position in which it is blocked longitudinally by the pistons 20.

To block the device perpendicularly to the back wall of the rail, it is necessary to pivot the control lever 12 around the pin 23, which has the effect of moving the sliding nut 11 in the direction of the piston 20a, the base 10 remaining fixed and the pin 43 moving in the elongated slots 32. When the stops 45 come into contact with the respective flanges 18, the protrusions 36 are placed level with three successive narrowed sections 7 where they are blocked by the integral protrusions of the wings 3 between two successive notches 5. The device is then in its closed position shown in FIG. 3b.

In the latter position, the pin 43 is resting against the flexible stop 34 which is therefore compressed, which has the effect of compensating for the play between the base 10 and the sliding nut 11 and between these two elements and the rail.

Furthermore, during the movement of the sliding nut, the points of the hooks 44 separate the plate spring 50 due to the curved shape of the sides 53 of the spring. When the device reaches its closed position, the sides 53 fall behind the hooks 44 and the rod 51 rests on the flat section 60 of the element 22, thus locking the lever 12 and thereby the whole of the device.

Figure 4:
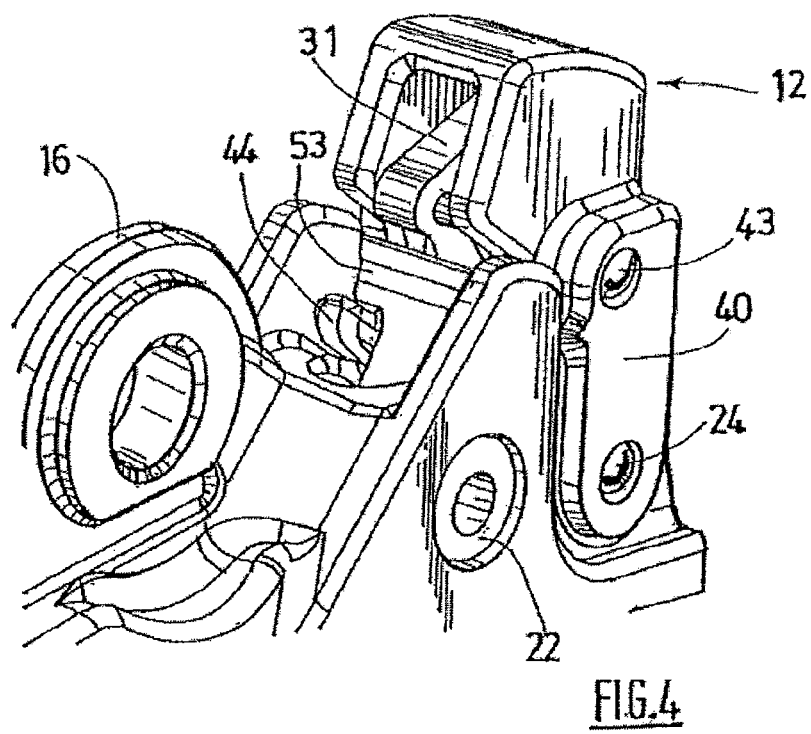
FIG. 4 is a perspective view, on a larger scale, of a part of this device.
Figure 2:
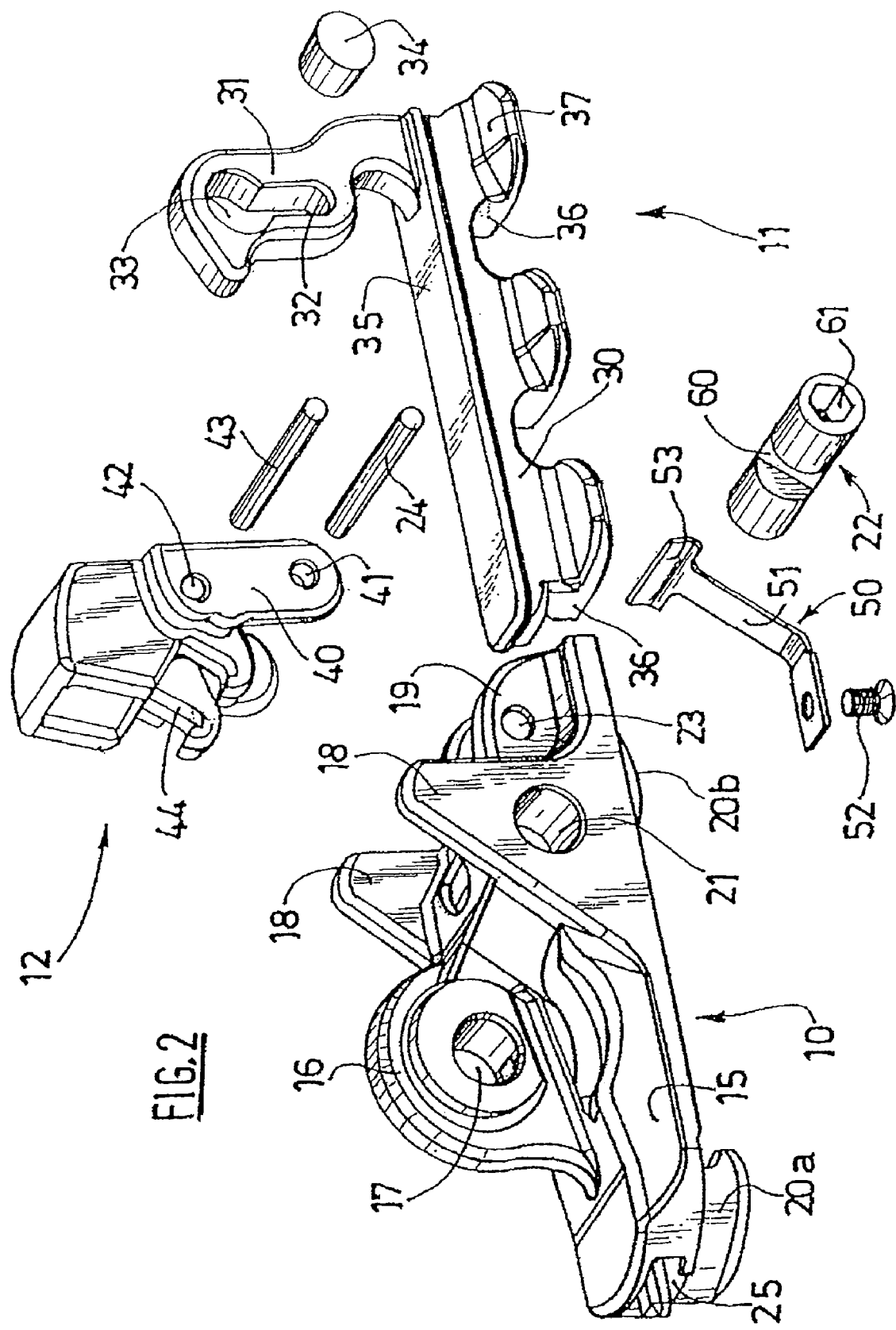
FIG. 2 is an exploded perspective view of a device according to the invention.

Referring now to FIG. 4, the relative position of the hooks 44 and of the spring 50, and therefore the locking state of the device, are visible.

In order to unlock the device, it is enough simply to pivot the element 22 with the help of a suitable spanner. The element 22 then pushes the rod 51 away from the spring 50 and thereby releases the latter from the hooks 44.

Figure 6:
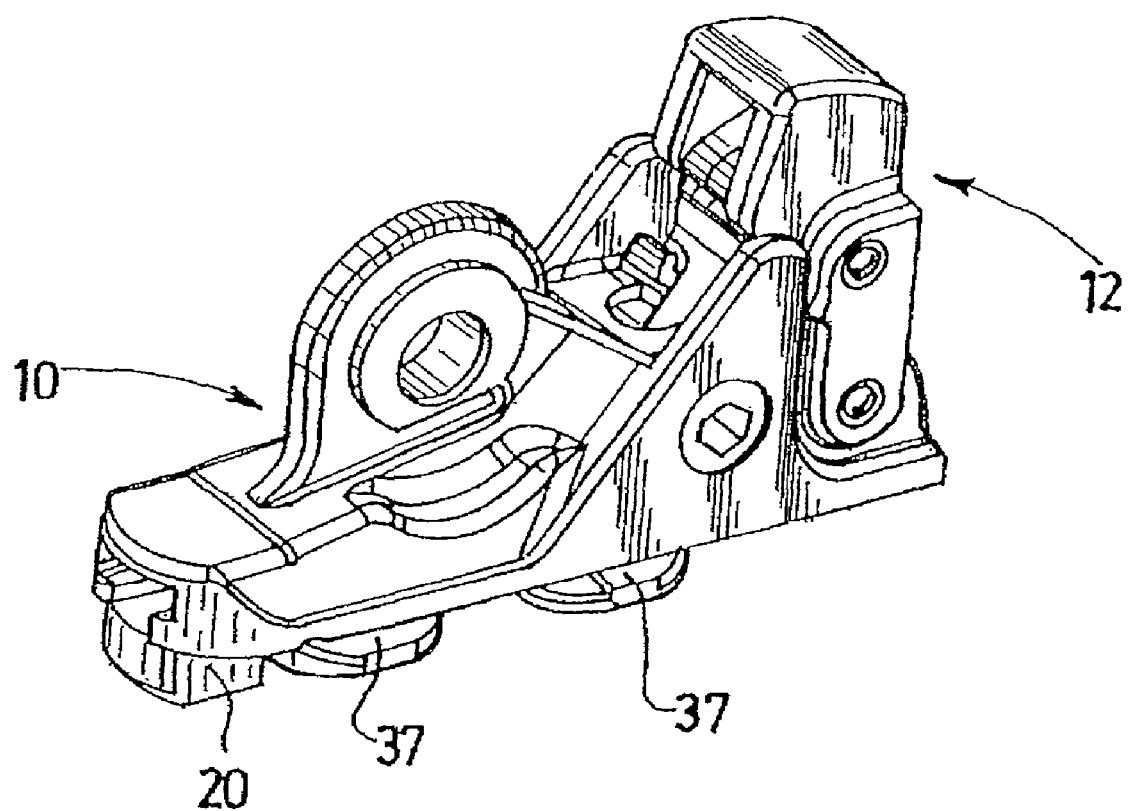
FIG. 6 is a perspective view of an alternative embodiment of this device.

Referring now to FIG. 6, there is shown a variant in which the base 10 only comprises a single piston 20 and the sliding nut 11 only comprises two protrusions 36.

I claim:

1. A device for mounting a seat on a mounting rail, said rail comprising a back wall, two lateral walls and two wings that delimit a groove in the shape of an inverted T, said wings forming notches at regular intervals that define widened and narrowed sections of a passage in between edges of the wings, said device comprising:
   a base, a sliding nut, a control lever, and a locking means; wherein
   the base comprises a band operable for linking to the seat, the groove adapted to receive a guide rail, and a longitudinal blocking piston operably insertable into one of said widened sections of the mounting rail such that the piston is restrained longitudinally from entering one of said narrowed sections, said base being releasably secured to said mounting rail;
   the sliding nut comprises protrusions that form lateral lips, and the guide rail insertable into said groove of the base, said sliding nut being arranged so as to slide in relation to said base when said base is releasably secured to said mounting rail with said protrusions placed in said mounting rail, in between an installation position and a blocked position, such that:
   in said installation position, when the piston of the base is in one of said widened sections, the lips of the sliding nut can be inserted in one of such widened sections, and
   in said blocked position, the lips of the sliding nut are held by said wings in one of said narrowed sections;
   the control lever is hinged to said base and said sliding nut, so as to cause said lever to move in between an open position and a closed position in relation to said installation position and said blocked position of the sliding nut; and
   the locking means is operable to lock said lever in its closed position.

2. A device according to claim 1, further comprising a compressable support for compensating for play that exists between the mounting rail and the device when the sliding nut passes from said installation position to said blocked position.

3. A device according to claim 2, wherein said compressable support comprises a flexible stop for a sliding pin.

4. A device according to claim 3, wherein said flexible stop is arranged in one of said widened sections at the end of an elongated slot in which said sliding pin slides when said sliding nut reaches said blocked position.

5. A device according to claims 1, 2, 3, or 4 wherein said locking means comprise a spring plate operably connected on the base and capable of cooperating with a hook solidly attached to the control lever.

6. A device according to claims 1, 2, 3, or 4, or, further comprising unlocking means operable to unlock said lever from its closed position.

7. A device according to claims 1, 2, 3, or 4, further comprising unlocking means operable to unlock said lever from its closed position, wherein said unlocking means comprise a cam which, in one of its positions, allows a spring plate to rest against the bottom of a hook, and in another position, pushes the spring plate back out of the hook.

8. A device according to claims 1, 2, 3 or 4 further comprising unlocking means operable to unlock said lever from its closed position; wherein said unlocking means comprise a cam which, in one of its positions, allows a spring plate to rest against the bottom of a hook, and in another position, pushes the spring plate back out of the hook; wherein a cam is eccentric and capable of being driven in rotation between said one of its positions and said another position with the help of a spanner.

* * * * *